G. LANE.
DOOR HANGER.
APPLICATION FILED JULY 10, 1908.
913,518. Patented Feb. 23, 1909.
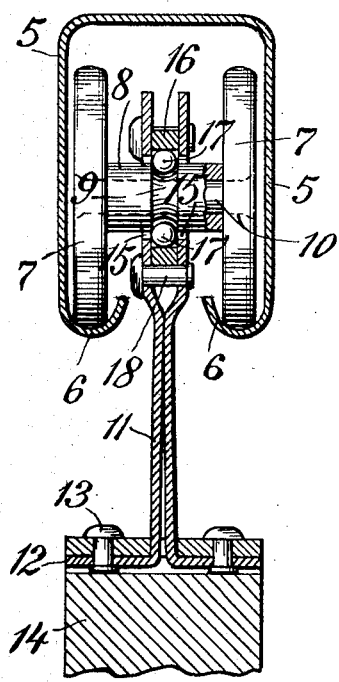
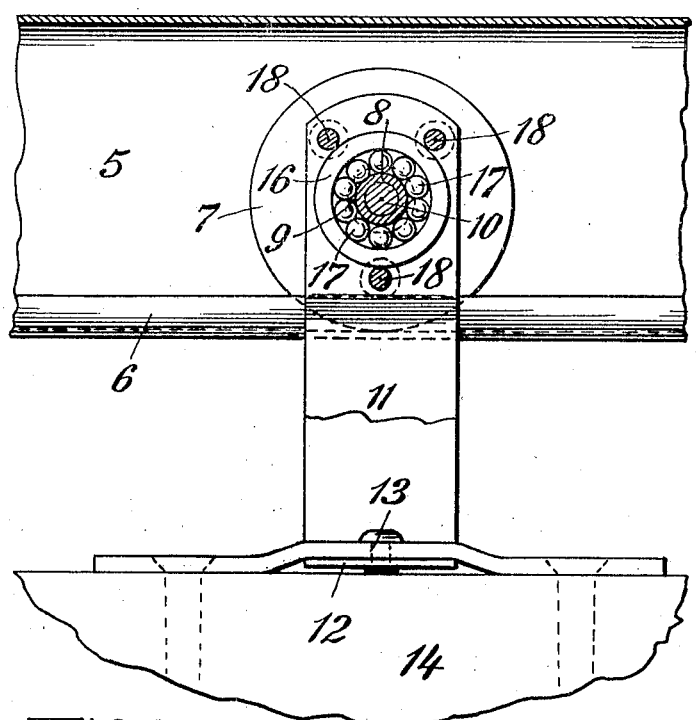
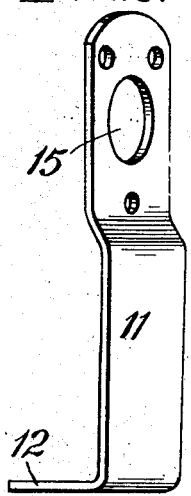
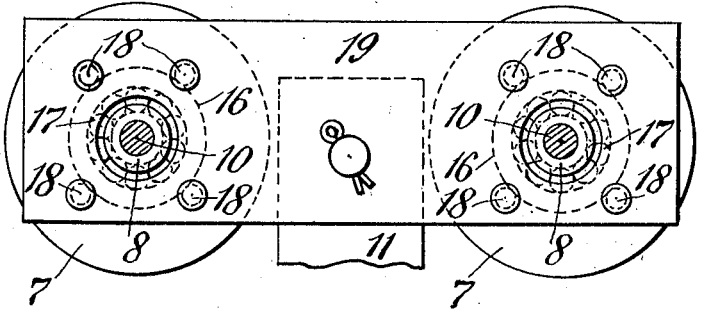
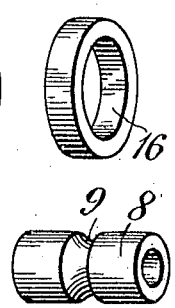
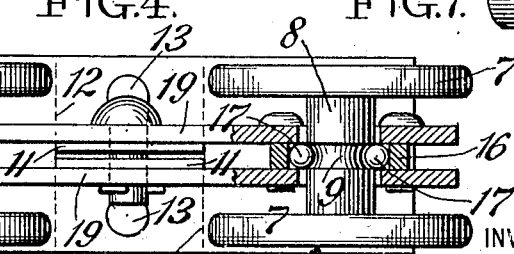

UNITED STATES PATENT OFFICE.

GEORGE LANE, OF POUGHKEEPSIE, NEW YORK.

DOOR-HANGER.

No. 913,518.　　　Specification of Letters Patent.　　　Patented Feb. 23, 1909.

Application filed July 10, 1908. Serial No. 442,880.

*To all whom it may concern:*

Be it known that I, GEORGE LANE, a citizen of the United States, residing at Poughkeepsie, county of Dutchess, and State of New York, have invented an Improvement in Door-Hangers, of which the following is a specification.

My invention consists in an improvement in door hangers of the type wherein a pair or pairs of wheels carry the load and move along inclosed grooved trackways.

My invention consists in the construction of ball-bearing or bearings for the wheels which support the load.

The object of my invention is to make a thoroughly durable and serviceable bearing at low manufacturing cost.

The accompanying drawings will serve to illustrate my invention, in which—

Figure 1 is a transverse section of the trackway, the ball-bearing, the supports for the load, with the wheels in elevation. Fig. 2 is a longitudinal section taken through the trackway and one side of a ball-bearing, with the other part shown in elevation. Fig. 3 shows a modification of my invention where two pairs of wheels are used instead of one. Fig. 4 is a plan view and partial section of Fig. 3. Fig. 5 is a view in perspective of one of the supporting members. Fig. 6 is a view in perspective of one of the bearing rings. Fig. 7 is a view in perspective of connecting axle or bushing for the wheels.

In the drawings 5 represents the trackway, which is of the usual construction and provided with grooved runways 6. Situated in the runways are the wheels 7: one pair of wheels are shown in Fig. 1 and two pairs in Fig. 3. The wheels 7 are connected together by an axle 8 which comprises a cylindrical portion of hard steel having open ends and a semi-cylindrical annular groove 9 formed in its center. The wheels are suitably secured to the axle by means of screws or rivets 10, Fig. 1, which screws or rivets are adapted to fit into the ends of said axle and form a part thereof. Surrounding the axle are supporting members 11 which are turned at right angles at their lower ends 12 and secured by rivets 13 to the top of a door 14 or body which it is desired to move along the trackway. The supporting members 11 have circular openings 15 therein, which openings are slightly greater in diameter, than the outer circumference of the axle 8 and slightly less than the inner circumference of the race ring 16. The race ring 16, having a flat inner periphery, is introduced between the supporting members 11 and serves to space these members apart and also to form one surface of a race way, the other surface being formed by the semi-circular groove 9 of the axle 8. Situated between these two surfaces are the balls 17.

18 represents rivets for connecting the supporting members together. In the construction shown in Fig. 3, the supporting members 11 are pivotally connected to horizontal plates 19, which in turn are pivotally connected to the axle 8. The construction shown in Fig. 3 being substantially the same as that shown in Fig. 1, except there are two points of suspension instead of one. It will be observed that the race way for the balls is formed between two hardened surfaces, *i. e.* between the groove 9 of the axle 8 and inner surface of the ring 16, which surfaces can be made of any metal suitable for the purpose and adapted to withstand the load strains to which these parts are subjected. Further that the inner opposed surfaces of the supporting members 11 coöperate with the ring by acting as restraining guides for the balls. These parts it will be understood have little wear and can consequently be made of soft metal.

Having thus described my invention, I claim:

1. A door hanger comprising a trackway, a pair of wheels, an axle provided with a semi-cylindrical groove connecting said wheels, a door supporting device carried by said axle, said door supporting device comprising a pair of supporting members having circular openings therein, a flat-faced ring seated between said members and a series of balls introduced between said ring and said axle.

2. A door hanger comprising a trackway, a pair of wheels, an axle connecting the wheels and provided with a semi-circular groove at its center, a pair of supporting members having openings therein for receiving the axle, a ring seated between said supporting members and slightly larger in its interior diameter than the opening in the supporting members, and balls situated in the race way formed by the semi-circular groove in the axle and the surrounding ring.

3. A door hanger comprising a trackway, a pair of wheels, an axle connecting said wheels and provided with a concave groove at its center, a pair of supporting members provided with openings therein for the reception of the axle, a flat-faced ring situated between said supporting members and surrunding the axle, and a series of balls situated in the race way formed by said concave groove, the interior surface of the ring and the interior surfaces of the supporting members.

4. In a door hanger a ball bearing, comprising an axle having a semi-cylindrical groove situated centrally thereof and the supporting wheels thereon, a ring arranged centrally of said axle, balls introduced between the groove of the axle and the inner periphery of the ring, supporting members having perforations therein arranged centrally with said axle but of smaller diameter than the inner periphery of the ring and means for securing said ring and supporting members together.

In testimony whereof, I affix my signature, in the presence of two witnesses.

GEORGE LANE.

Witnesses:
  C. J. BROWER,
  O. T. MAMBERT.